United States Patent [19]
Mori

[11] Patent Number: 5,390,049
[45] Date of Patent: Feb. 14, 1995

[54] PHOTOGRAPHIC LENS

[75] Inventor: Nobuyoshi Mori, Hachioji, Japan

[73] Assignee: Konica Corporation, Tokyo, Japan

[21] Appl. No.: 99,557

[22] Filed: Jul. 30, 1993

[30] Foreign Application Priority Data

Aug. 6, 1992 [JP] Japan .................................. 4-210389

[51] Int. Cl.$^6$ ............................................. G02B 9/00
[52] U.S. Cl. ................................. 359/739; 359/718; 359/748
[58] Field of Search ............. 359/647, 718, 738–739, 359/748, 753, 796–797

[56] References Cited

U.S. PATENT DOCUMENTS

5,000,552 3/1991 Simpson, Jr. et al. ............... 359/794
5,067,803 11/1991 Ohno ................................... 359/794

FOREIGN PATENT DOCUMENTS

4139452 6/1992 Germany.
2200760 8/1988 United Kingdom.

*Primary Examiner*—Loha Ben
*Assistant Examiner*—James Phan
*Attorney, Agent, or Firm*—Finnegan, Henderson, Farabow, Garrett & Dunner

[57] ABSTRACT

A photographic lens system includes a positive meniscus lens whose the both lens surfaces are shaped in a aspherical surface respectively, the lens is arranged to satisfy the following inequality:

$$0.02 < t/L < 0.05$$

wherein the length of a diagonal line of an image forming plane on said image forming surface is 2L and the lens thickness on the optical axis is t.

4 Claims, 13 Drawing Sheets

SPHERICAL ABERRATION    ASTIGMATISM    DISTORTION

LATERAL ABERRATION

FIG. 9

SPHERICAL ABERRATION | ASTIGMATISM | DISTORTION

LATERAL ABERRATION

FIG. 10

LATERAL ABERRATION

FIG. 11

SPHERICAL ABERRATION    ASTIGMATISM    DISTORTION

LATERAL ABERRATION

SPHERICAL ABERRATION | ASTIGMATISM | DISTORTION

LATERAL ABERRATION

PHOTOGRAPHIC LENS

BACKGROUND OF THE INVENTION

The present invention relates to a photographic lens and more particularly relates to a photographic lens with less distortion and also relates to a camera to which the photographic lens is assembled.

Conventionally, single lenses for a fixed-focus camera, F-number of which is large, have been disclosed in Japanese Patent Publication Open to Public Inspection Nos. 199351/1988, 246713/1988 and 259108/1991.

However, the focal distance of the single lens disclosed in Japanese Patent Publication Open to Public Inspection No. 199351/1988 is 33 mm, and the total length of the single lens is 32 mm. Accordingly, the size of a camera to which the above lens is assembled is increased, so that the camera is not handy. On the other hand, when the focal distance is reduced and the field angle is increased, the distortion is sharply increased so that it exceeds 10%. In the case of the single lens disclosed in Japanese Patent Publication Open to Public Inspection No. 246713/1988, the field angle is approximately 60°, and when the lens is adopted to a Lica-size, the total lens length becomes about 35 mm that is long to handle the camera.

On the other hand, in the case of a single lens disclosed in Japanese Patent Publication Open to Public Inspection No. 259108/1991, the total lens length is short because it is used for a panorama size. However, the distortion of the lens exceeds 10%, and the astigmatism is increased at an intermediate field angle. Therefore, this lens is not desirable either.

As described above, a single lens with less distortion suitable for a small-size camera has not been provided up to now.

SUMMARY OF THE INVENTION

The present invention is to provide a lens for camera use, the total length of which is short, in which the distortion is excellently corrected, and also to provide a small-size camera unit to which the above lens is assembled. More particularly, the present invention is to provide a photographic lens that can be assembled to an inexpensive compact camera such as a disposable photographic camera.

Figure 1B:
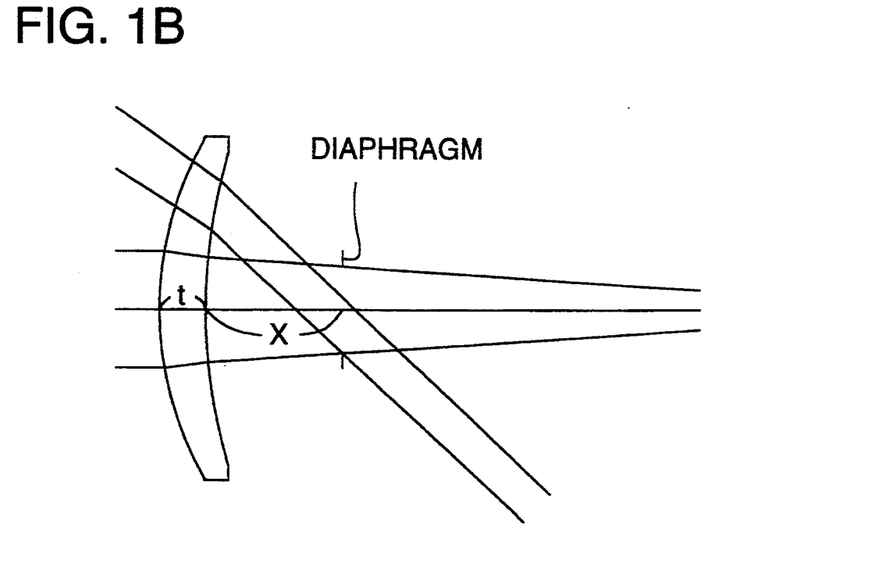
FIG. 1B is a sectional view with respect to the second embodiment of the present invention.
Figure 2A:
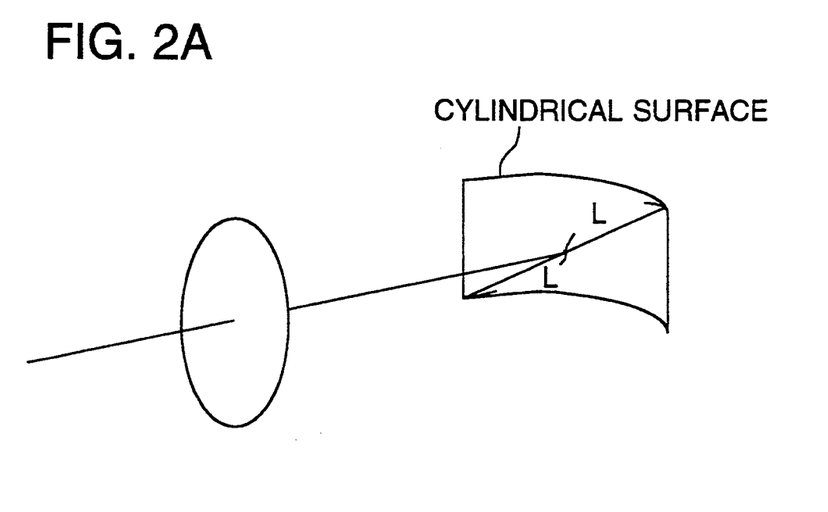
FIGS. 2A and 2B are illustrations showing respectively arrangements of a lens and image forming surface.
Figure 2B:
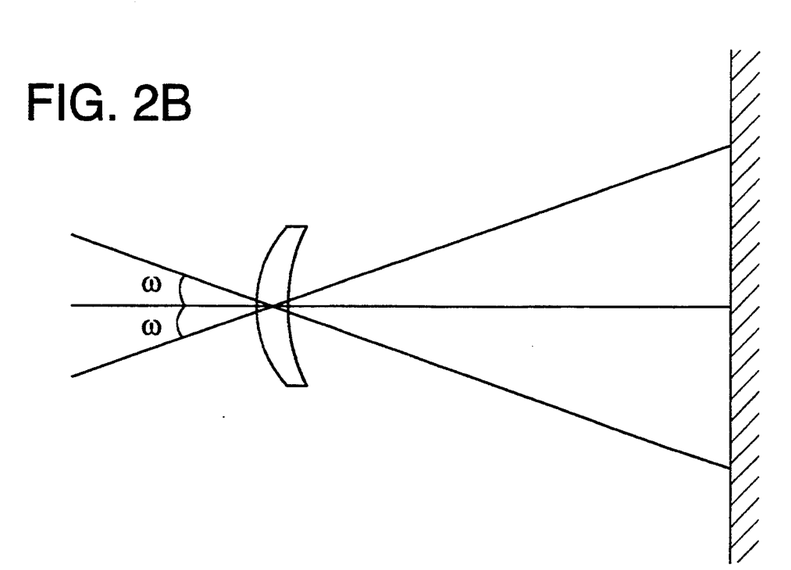

Hereinafter, notations t, X, L and ω can be referred in FIGS. 1B, 2A and 2B.

The present invention includes two embodiment. The first embodiment is to provide an aspherical photographic lens, both sides of which are formed aspherical, the photographic lens being disposed between a photographic object and an image formation surface, a diaphragm being disposed between the lens and the image formation surface, the photographic lens being a positive meniscus lens, the object side of the lens being formed convex, wherein the lens satisfies the following inequality $$0.02 < t/L < 0.05 \tag{1}$$

where the length of a diagonal line of an image plane on the image formation surface is 2L, and the lens thickness on the optical axis is t.

Especially when the lens is used under the following condition $$60° < 2\omega < 90° \tag{2}$$

the present invention is to provide an aspherical photographic lens, both sides of which are formed aspherical, the photographic lens being disposed between a photographic object and an image formation surface, a diaphragm being disposed between the lens and the image formation surface, the photographic lens being a positive meniscus lens, the object side of the lens being formed convex, wherein the lens satisfies the following inequality $$0.02 < t/L < 0.06 \tag{1}$$

where the length of a diagonal line of an image plane on the image formation surface is 2L, and the lens thickness on the optical axis is t.

Desirable effect can be provided by a photographic lens satisfying the following inequality $$0.01 < x/L < 0.07 \tag{4}$$

where a distance between the second surface of the photographic lens and the diaphragm disposed between the photographic lens and the image formation surface is x, wherein the profile of the aspherical surface is formed in such a manner that: an amount of deformation at a position on the aspherical surface is monotonously increased as the height of the position from the optical axis is increased. Also, desirable effects can be provided by a photographic lens satisfying the following inequality $$20 < A(h_{max})/A(h_{max}/2) < 50 \tag{5}$$

where the height from the optical axis is h, the amount of deformation of the aspherical surface is A(h), and the effective radius of the lens is $h_{max}$.

The second embodiment is to provide an aspherical photographic lens, both sides of which are formed aspherical, the photographic lens being disposed between a photographic object and an image formation surface, a diaphragm being disposed between the lens and the image formation surface, the photographic lens being a positive meniscus lens, the object side of the lens being formed convex, wherein the lens satisfies the following inequality $$0.04 < t/L < 0.08 \tag{6}$$

where the length of a diagonal line of an image plane on the image formation surface is 2L, and the lens thickness on the optical axis is t, and the photographic lens also satisfies the following inequality $$0.1 < x/f < 0.15 \tag{7}$$

where a distance between the second surface of the lens and the diaphragm is x and the focal distance of the lens is f. Further, desirable effects can be provided by a photographic lens in which at least the object side of the lens is formed aspherical and the profile of the aspherical surface is formed in such a manner that an amount of deformation is monotonously increased in the negative direction as the height from the optical axis is increased.

Especially when a photographic lens, the image formation surface of which is composed of a cylindrical surface curved onto the lens side, is adopted, desirable effects can be provided.

Desirable effects can be provided by a camera including: an aspherical photographic lens, both surfaces of which are formed aspherical, the photographic lens projecting an object image on a cylindrical image formation surface curved onto the lens side with a radius of curvature of 80 mm to 300 mm, the photographic lens being a positive meniscus lens having a convex surface on the object side, the photographic lens satisfying the inequality of $0.02 < t/L < 0.05$ where the length of a diagonal line on the image plane of the image formation surface is 2L and the lens thickness on the optical axis is t, an amount of deformation of the lens being monotonously increased as the height from the optical axis is increased, the lens satisfying the inequality of $20 < A(h_{max})/A(h_{max}/2) < 50$ where the height from the optical axis is h, the deformation amount of the aspherical surface is A(h), and the effective radius of the lens is $h_{max}$, the lens satisfying the inequality of $60° < 2\omega < 90°$ where the field angle is $2\omega$, wherein the camera is constituted so that the inequality of $0.01 < x/L < 0.07$ can be satisfied where a distance between the second surface of the lens and a diaphragm disposed on the image formation surface side of the photographic lens is x, and wherein an unexposed film is fed onto the image formation surface so as to conduct photographing.

Moreover, desirable effects can be provided by a camera including: an aspherical photographic lens, the photographic lens projecting an object image on a cylindrical image formation surface curved onto the lens side with a radius of curvature of 80 mm to 300 mm, the photographic lens being a positive meniscus lens having a convex surface on the object side, the photographic lens satisfying the inequality of $0.04 < t/L < 0.08$ where the length of a diagonal line on the image plane of the image formation surface is 2L and the lens thickness on the optical axis is t, wherein the camera is constituted so that the inequality of $0.1 < x/f < 0.15$ can be satisfied where a focal distance of the lens is f, and a distance between the second surface of the lens and a diaphragm disposed on the image formation surface side of the photographic lens is x, and wherein an unexposed film is fed onto the image formation surface so as to conduct photographing.

Figure 3:
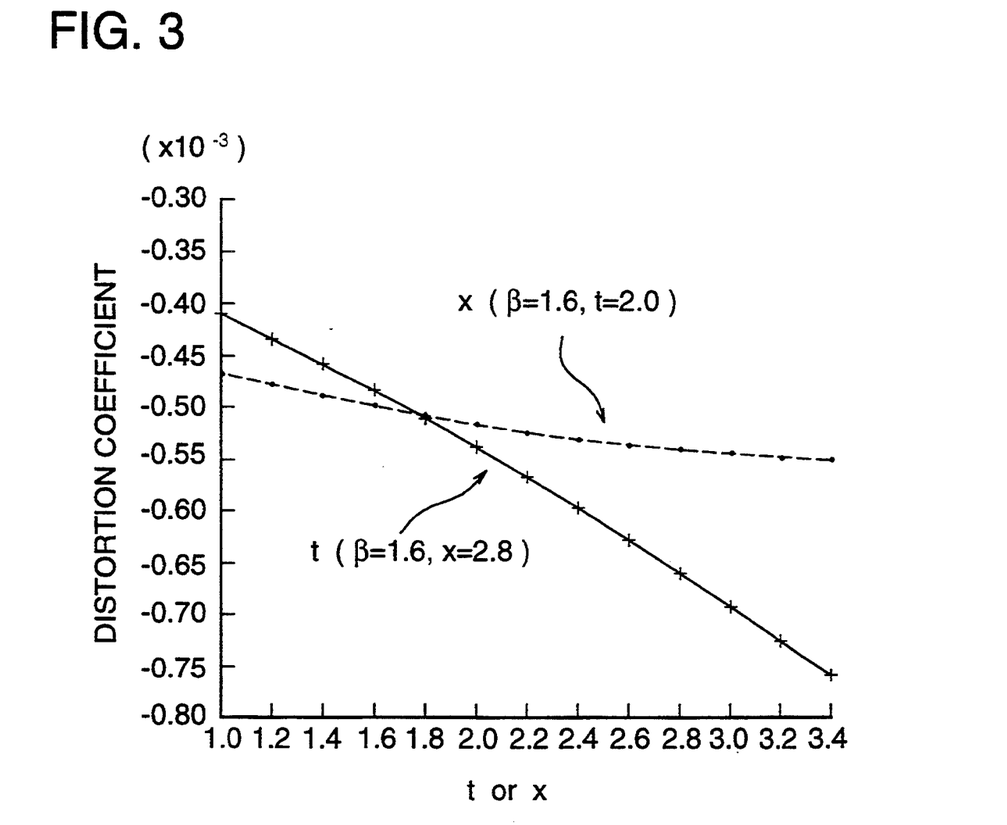
FIG. 3 is a graph showing a change of the three order distortion coefficient.
Figure 4:
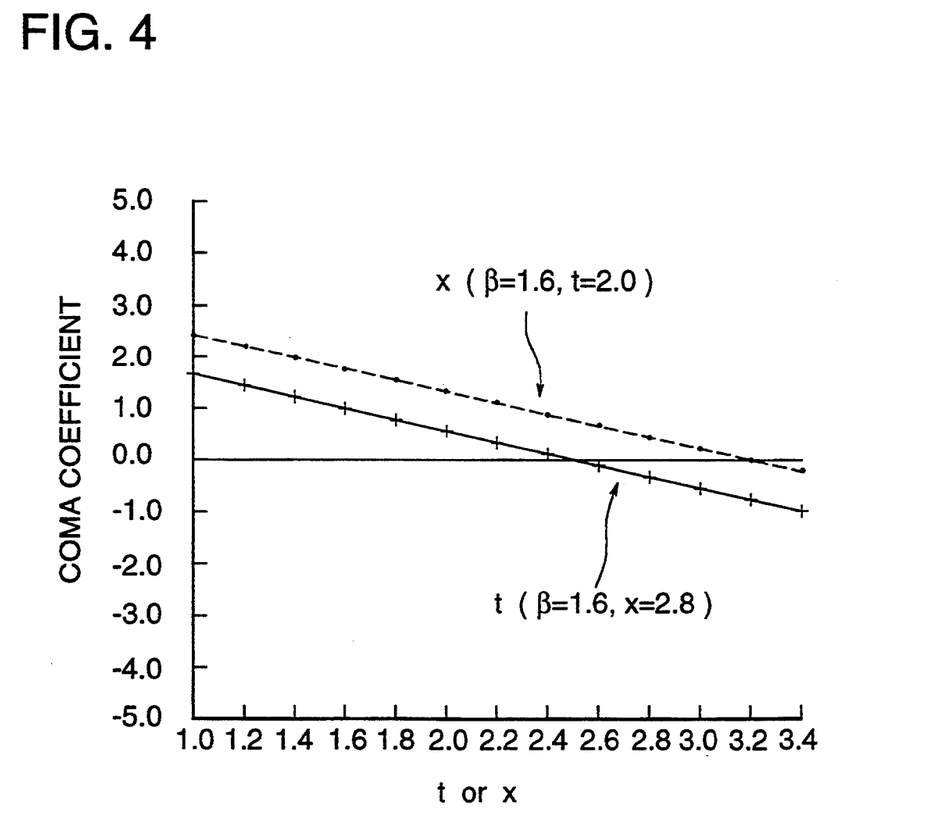
FIG. 4 is a graph showing a change of the three order coma aberration coefficient.
Figure 5:
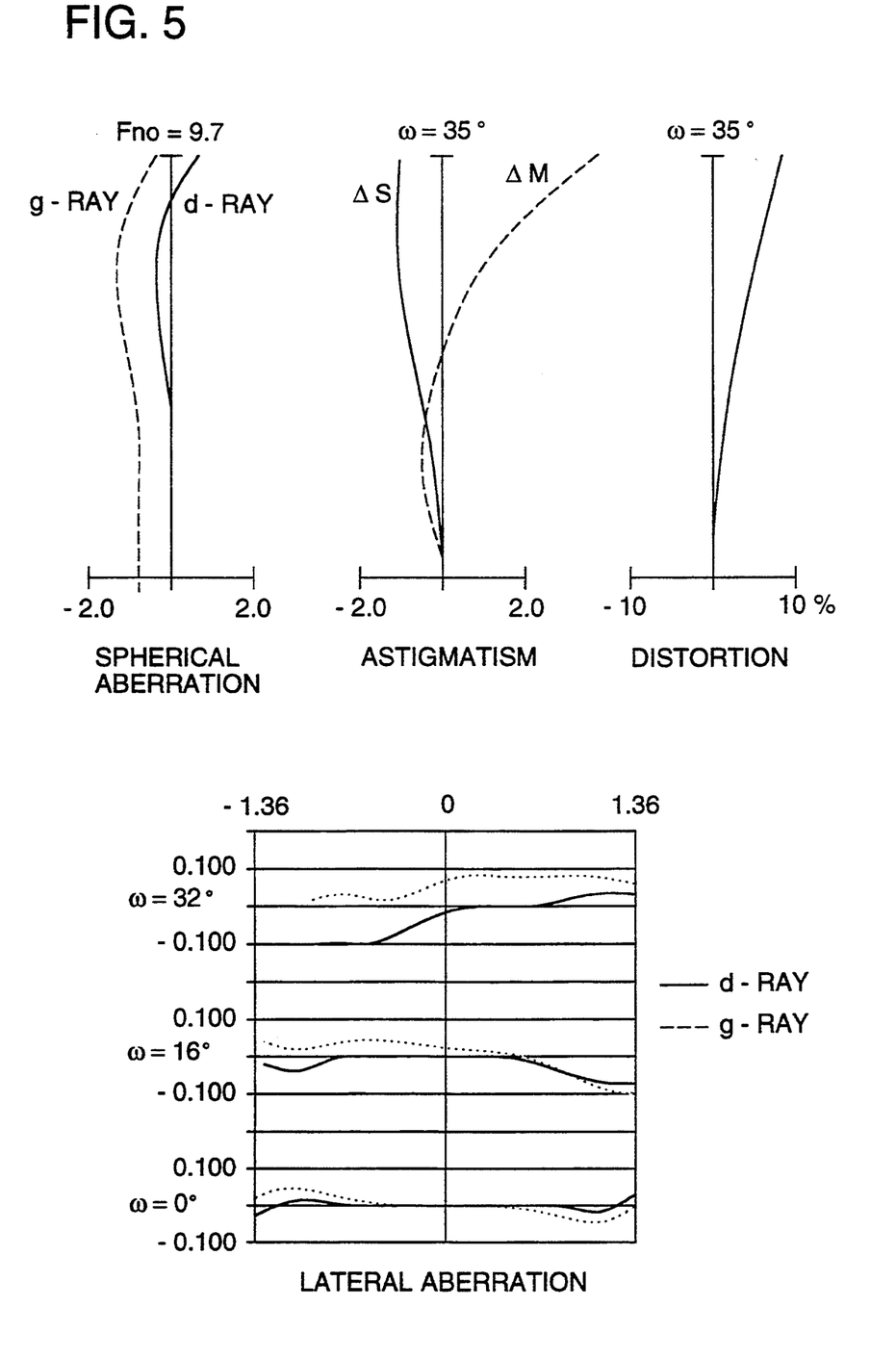
FIG. 5 is an aberration diagram of example 1 of the present invention.
Figure 6:
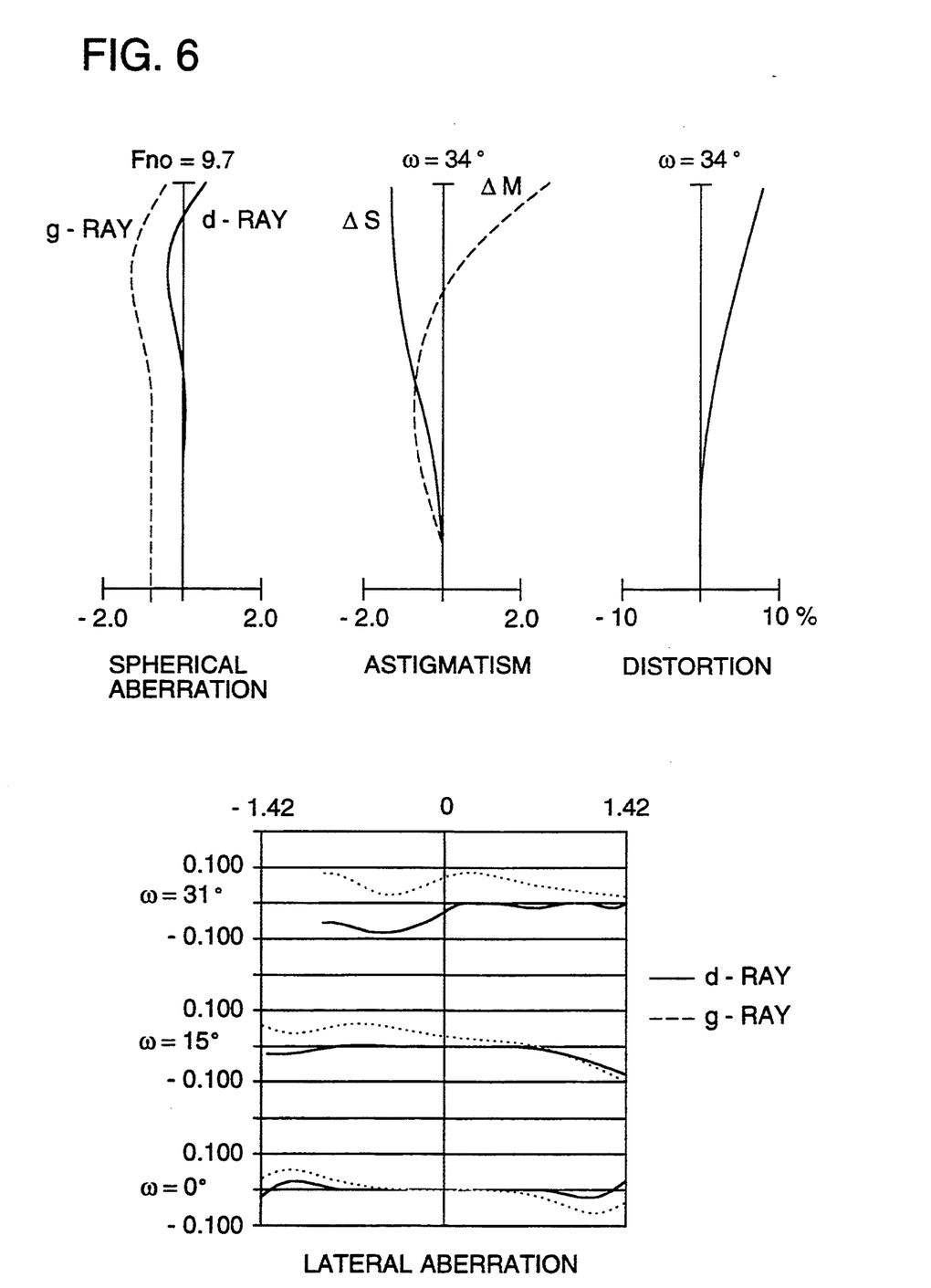
FIG. 6 is an aberration diagram of example 2 of the present invention.
Figure 7:
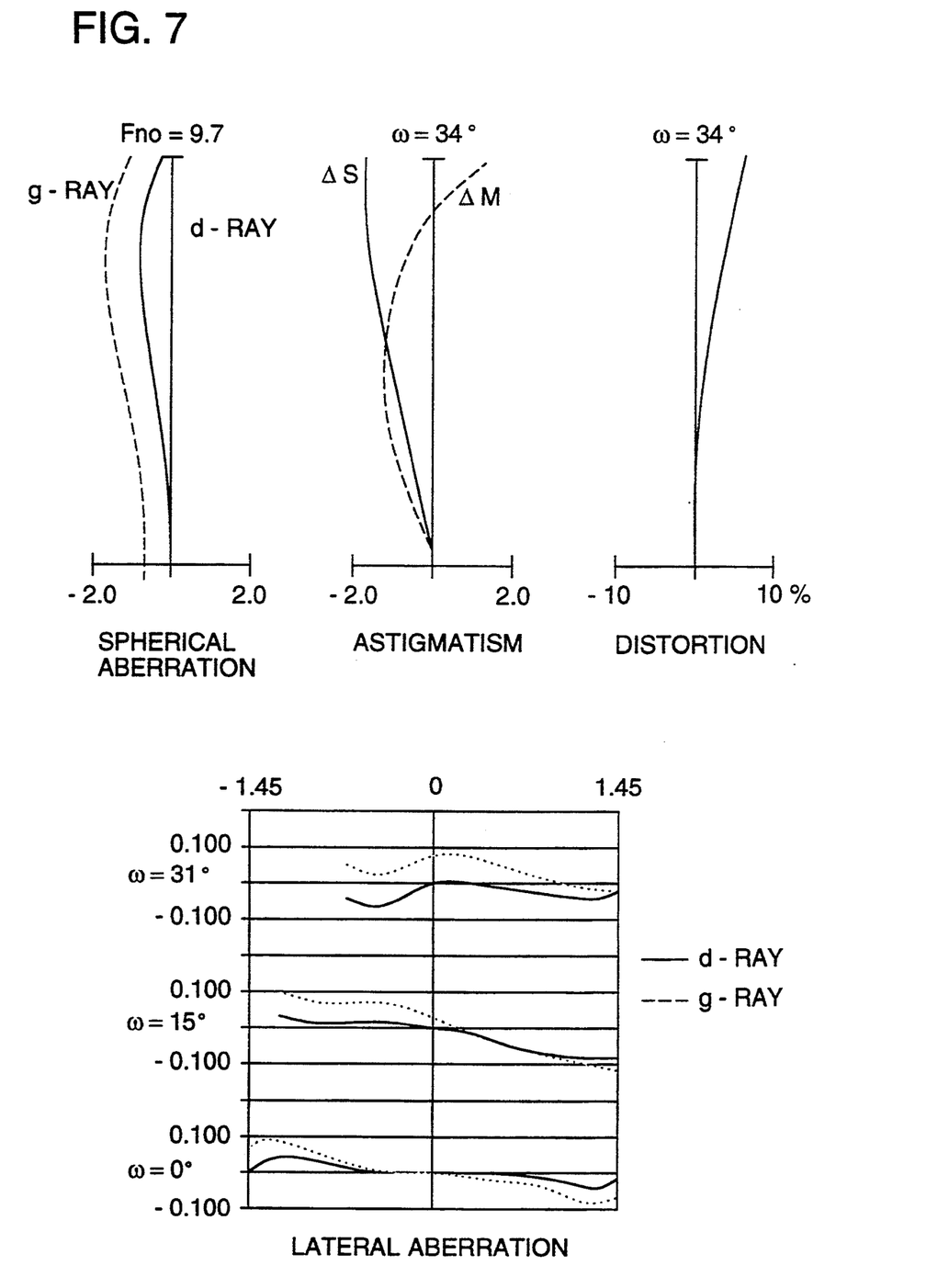
FIG. 7 is an aberration diagram of example 3 of the present invention.
Figure 8:
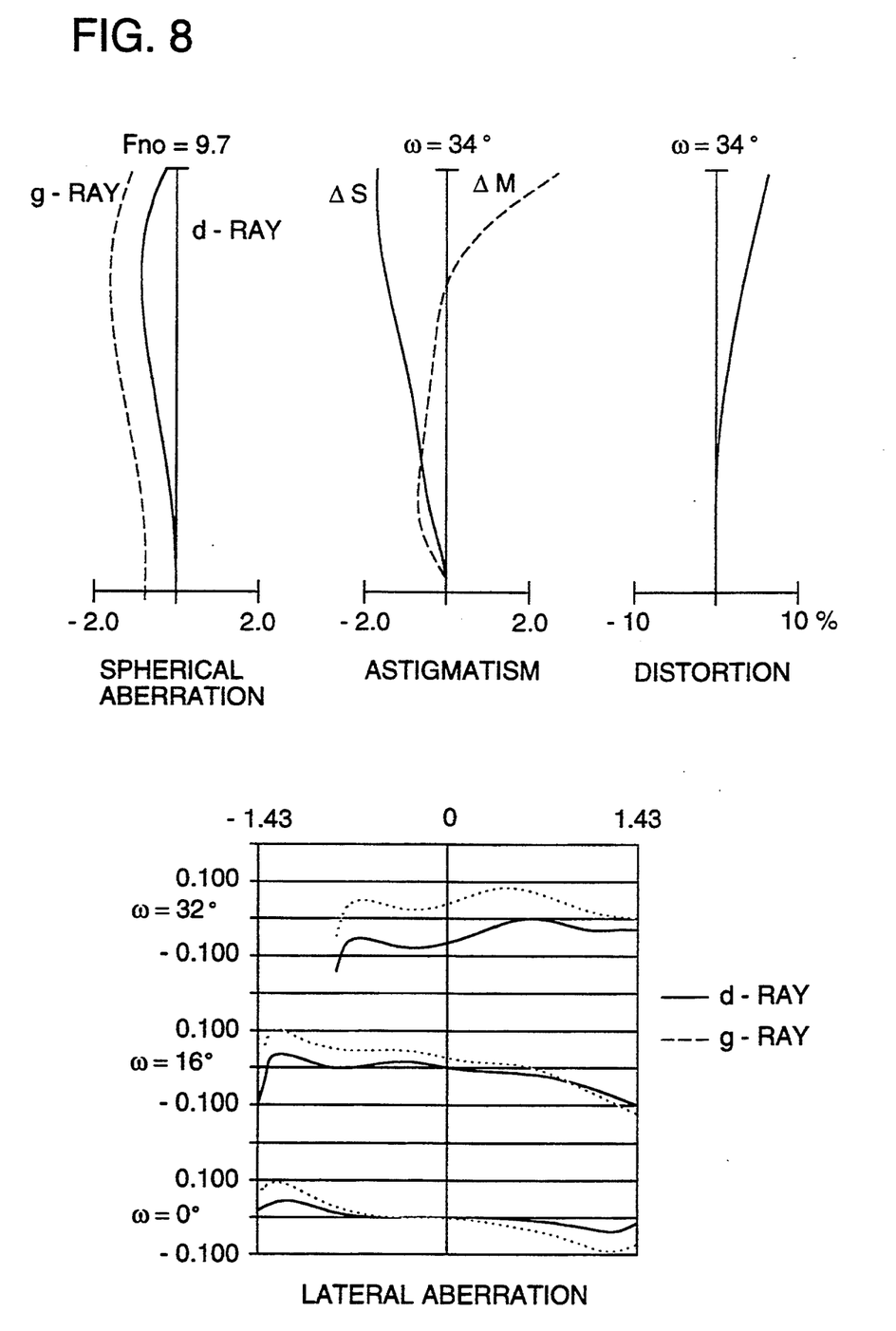
FIG. 8 is an aberration diagram of example 4 of the present invention.
Figure 9:
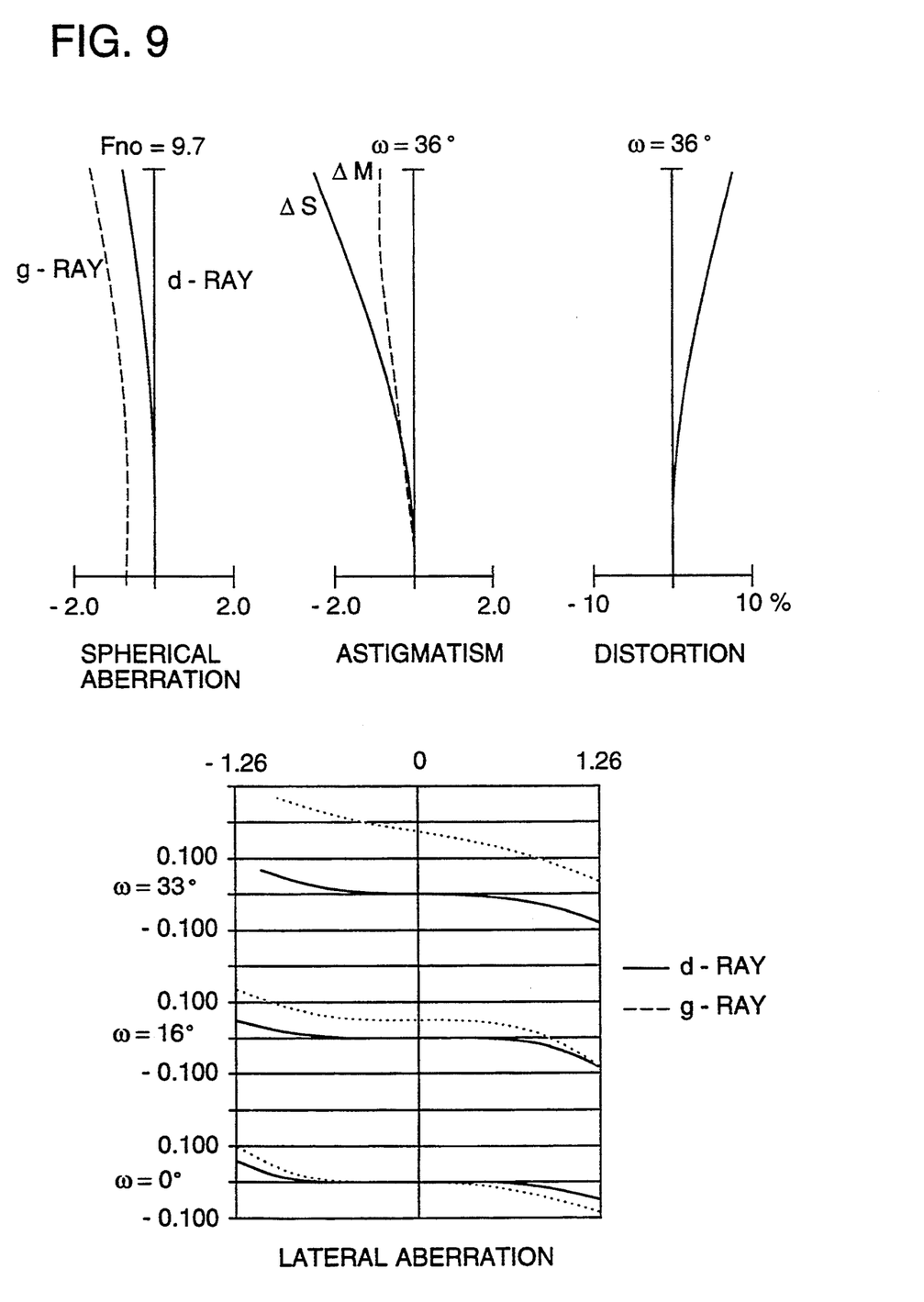
FIG. 9 is an aberration diagram of example 5 of the present invention.
Figure 10:
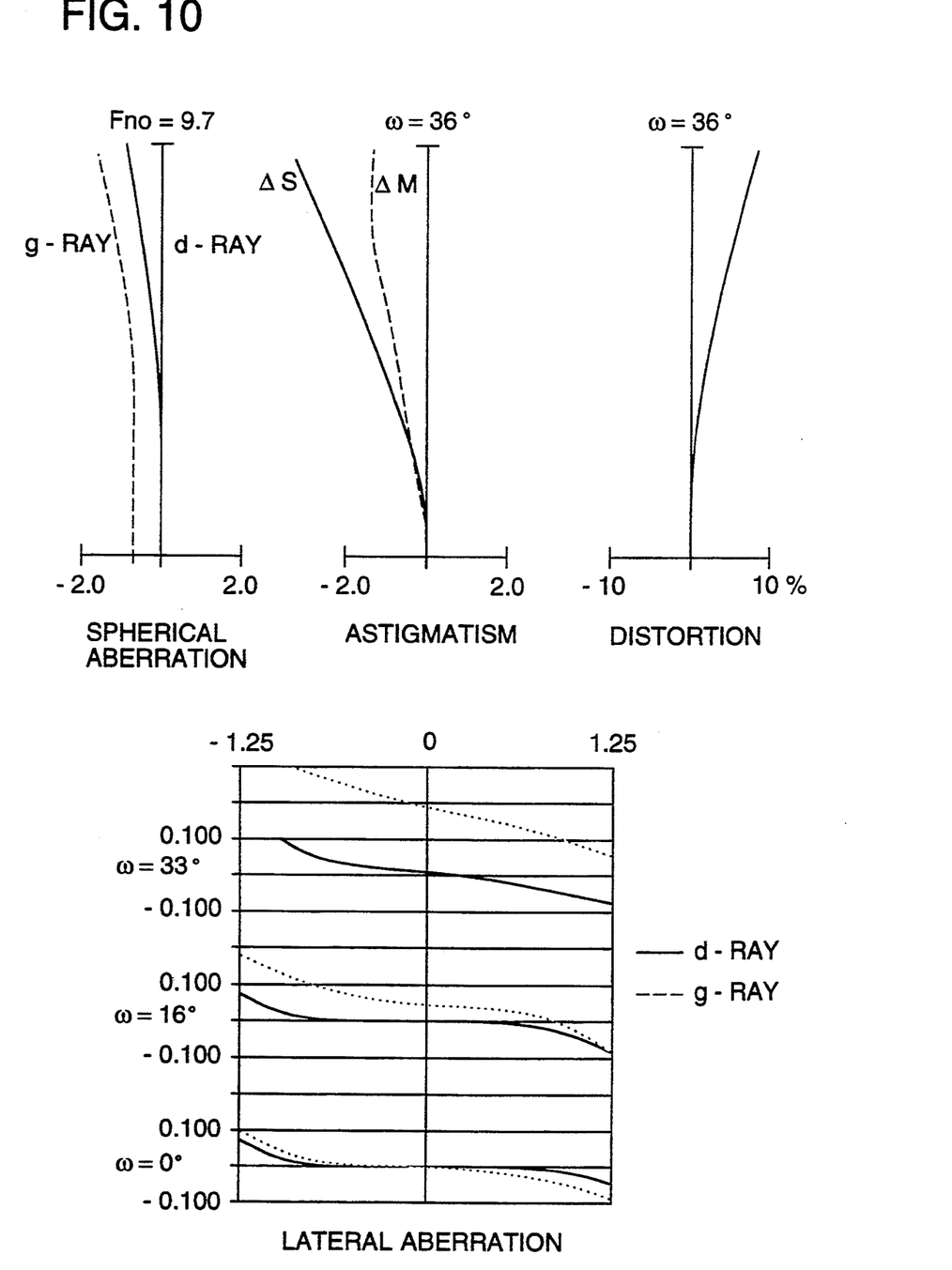
FIG. 10 is an aberration diagram of example 6 of the present invention.
Figure 11:
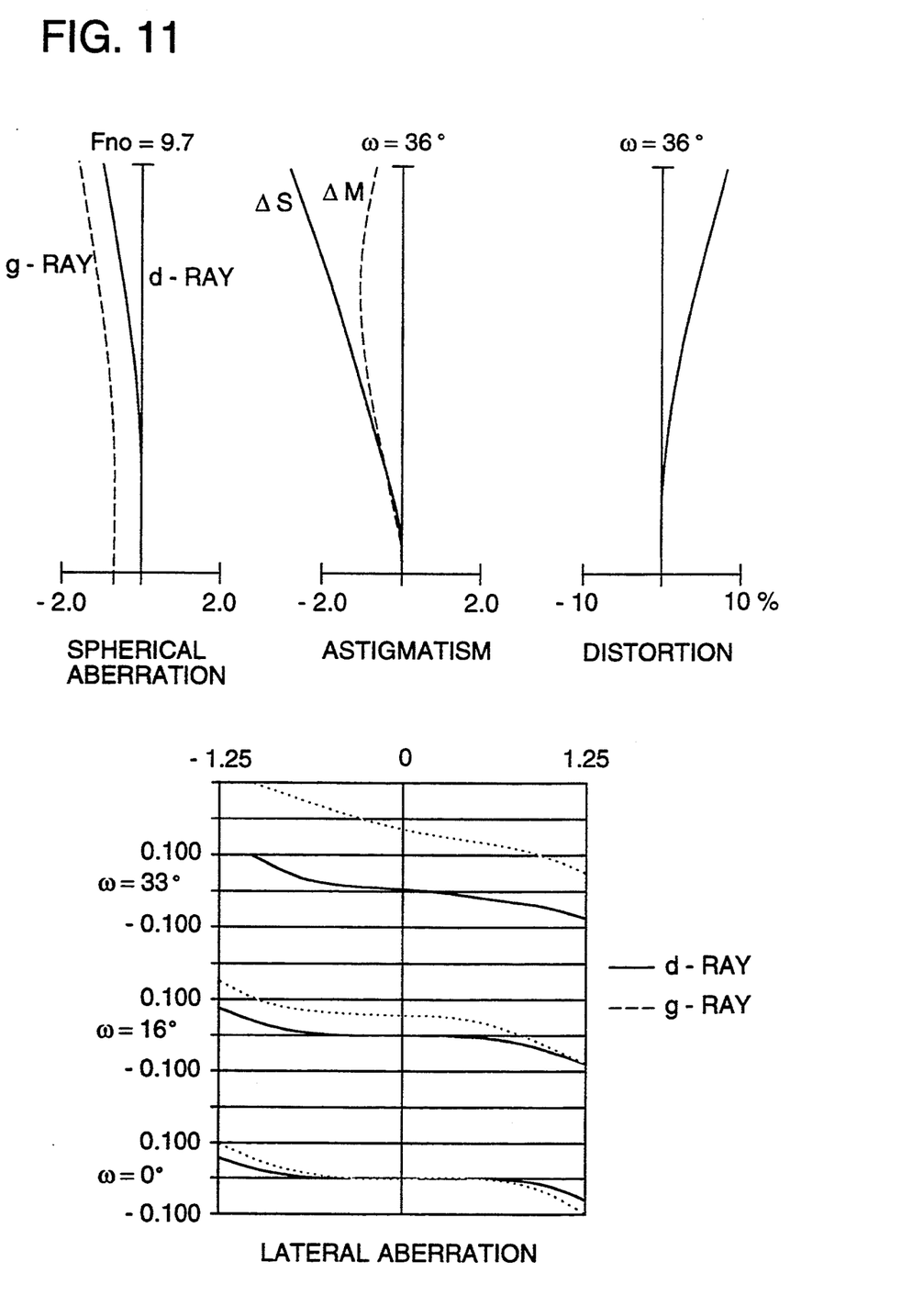
FIG. 11 is an aberration diagram of example 7 of the present invention.
Figure 12:
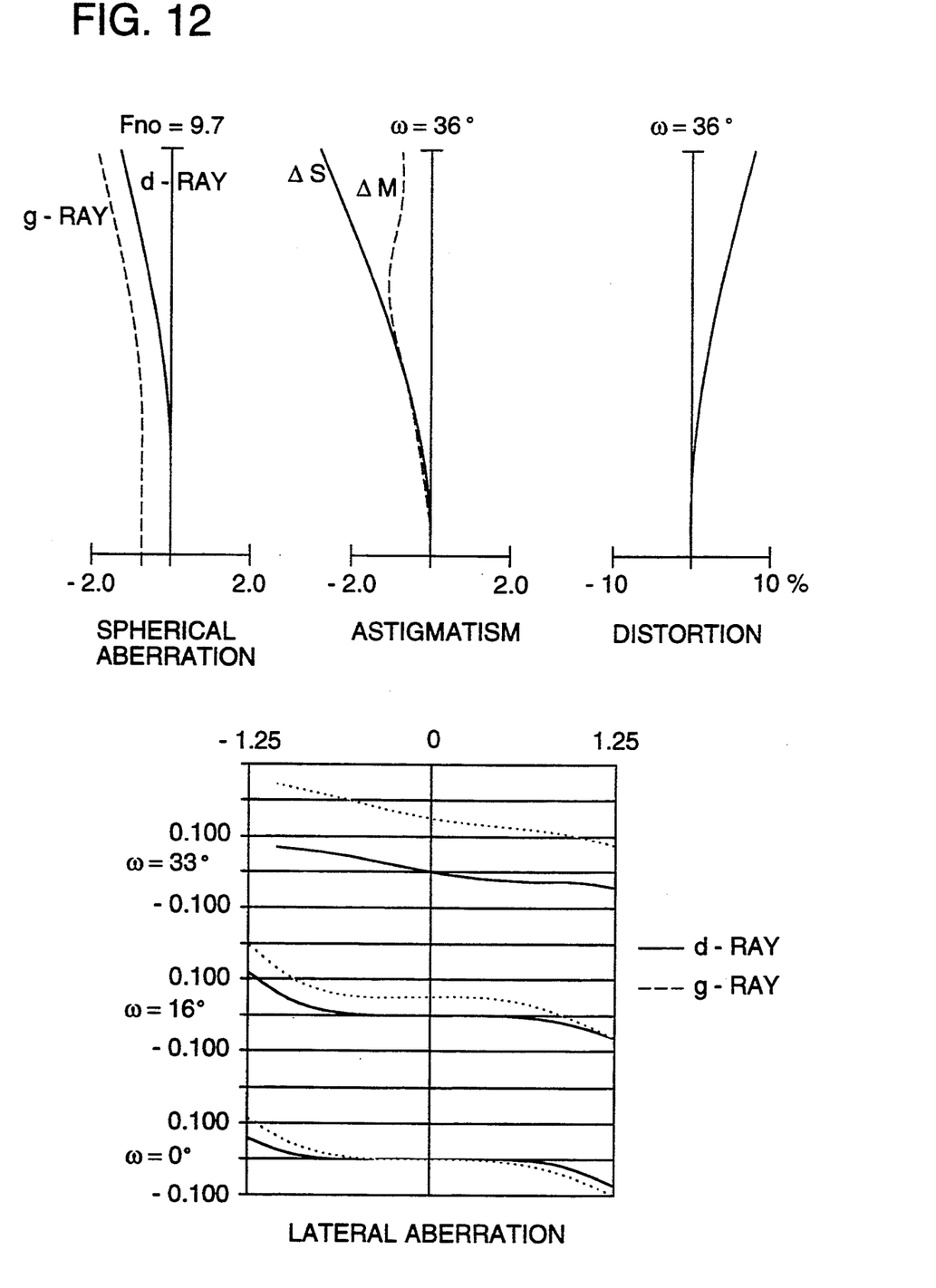
FIG. 12 is an aberration diagram of example 8 of the present invention.
Figure 13:
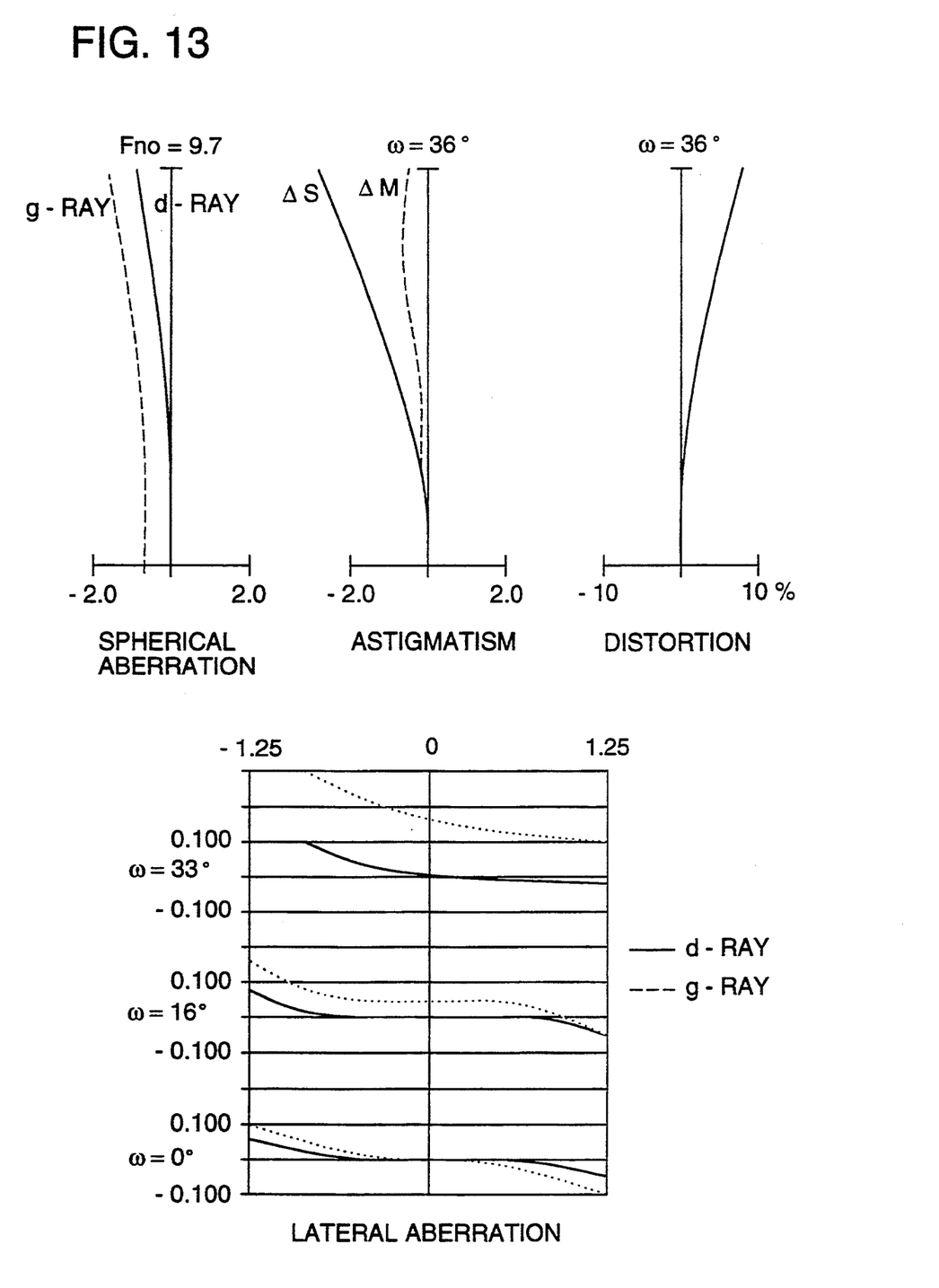
FIG. 13 is an aberration diagram of example 9 of the present invention.

FIGS. 3 and 4 are graphs for explaining the mode of operation of the photographic lens of the present invention.

In FIG. 3, a change of the third order aberration coefficient of distortion is shown in the case where thickness t of the meniscus lens on the optical axis and distance x between the second surface of the lens and the diaphragm are independently changed. In this case, the focal distance of the lens and the paraxial lateral magnification β of the first surface representing the lens profile are maintained to be constant.

As can be seen in FIG. 3, in the lens system of the present invention in which a diaphragm is disposed in the rear of a positive meniscus lens, the third order aberration coefficient of negative distortion is provided, and a pincushion type distortion is caused. When the lens thickness or the distance between the lens and the diaphragm is reduced, there is a tendency that the distortion is decreased. It can be seen in FIG. 3 that this tendency is more remarkable in a case where t is changed than a case where x is changed.

That is, when the lens thickness and the distance between the lens and diaphragm are reduced, distortion can be reduced. This action is more effective as much as 10 times in a case where the lens thickness is reduced than a case where the distance is reduced.

In the same manner as FIG. 3, a change of the third order aberration coefficient of coma is shown in FIG. 4 in the case where thickness t of the meniscus lens on the optical axis and distance x between the second surface of the lens and the diaphragm are independently changed. From the drawing, the following can be seen: When the thickness t and distance t are appropriately determined, the coma aberration coefficient can be made to be 0, that is, comatic aberration can be removed in the third order region. When, t and x are increased, the comatic aberration coefficient becomes negative, so that an extroverted comatic aberration is caused. When t and x are reduced, the coma aberration coefficient becomes positive, and an introverted comatic aberration is caused. The action in the case where t is changed is the same as the action in the case where x is changed.

Figure 1A:
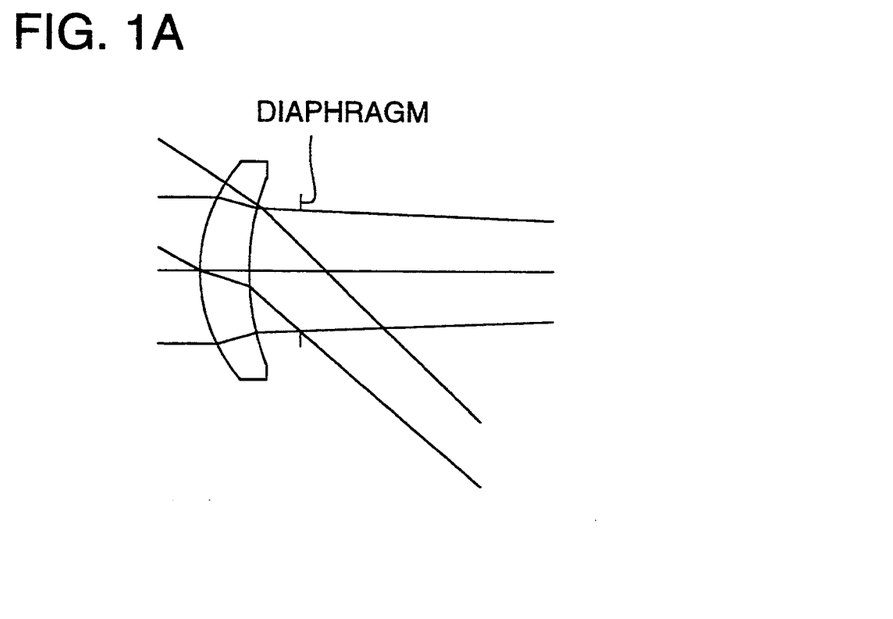
FIG. 1A is a sectional view with respect to the first embodiment of the present invention.

As described above, according to the present invention as shown in FIG. 1A, in the lens system including a positive meniscus lens, the convex surface of which is opposed to the object side, and also including a diaphragm disposed in the rear of the lens, the pincushion type distortion can be reduced when the lens thickness on the optical axis is reduced. At this time, the deterioration of comatic aberration can be restricted.

Expression (1) restricts the lens thickness on the optical axis. When the lens thickness exceeds the upper limit, the distortion is increased, and when the lens thickness exceeds the lower limit, the lens strength is lowered and further it becomes difficult to manufacture the lens.

The lower limit is basically permissible if it satisfies the relation:

$$0 < t/L$$

It is preferable if it satisfies the relation:

$$0.02 < t/L$$

Expression (2) restricts the field angle of the lens. When the field angle is increased in the case of the same image plane, the focal distance is shortened, so that the total lens length is also shortened. Therefore, a small-size compact camera can be provided. Also, the depth of filed is increased, and the influence of camera shake can be avoided. Therefore, this photographic lens is suitable for a fixed-focus camera and a disposable photographic camera. However, when the field angle is increased, the distortion is increased, and image formation performance is lowered in the periphery on the image plane.

When the field angle of the lens exceeds the upper limit of the expression (2), the distortion is extremely increased, so that image formation performance is deteriorated. When the field angle of the lens exceeds the lower limit of the expression (2), the total camera length is increased, so that the camera size is increased, which is disadvantageous from viewpoint of provided a handy camera.

When the field angle is increased while satisfying the expression (2), the distortion is increased, however, the correction can be conducted when the lens thickness on the optical axis is set as shown by expression (3). In the case where the lens thickness on the optical axis exceeds the upper limit of expression (3), the distortion is extremely increased, so that it is not desirable. In the case where the lens thickness on the optical axis exceeds the lower limit of expression (3), the lens becomes too thin, so that the strength is lowered and problems are caused in the manufacturing process.

In this case, the lens thickness on the optical axis that has been alleviated as compared with the expression (3) can be set.

The expression (4) is related to the arrangement method of the diaphragm. When distance x exceeds the upper limit, the field angle is increased, so that the luminous flux passes through the lens periphery. Therefore, it is necessary to increase the edge thickness of the lens on the optical axis. Accordingly, the correction of distortion can not be sufficiently performed. However, in the case where distance x slightly exceeds the upper limit of the expression (4), the distortion is small and the coefficient of astigmatism can be reduced. Therefore, the image surface is curved a little, that is, an approximately flat image formation surface can be provided. In the case where distance x exceeds the lower limit, the introverted comatic aberration is undesirably deteriorated as shown in FIG. 4. When the distance between the lens and the diaphragm is set in accordance with the expression (4), the distortion can be improved, however, the introverted comatic aberration remains. In order to correct the introverted comatic aberration, the meniscus lens may be formed in the following manner: both surfaces of the lens are formed aspherical; and the amount of deformation of the aspherical surface is monotonously increased as the height from the optical axis is increased.

Especially when an aspherical surface is adopted, on which the surface deformation amount is sharply increased in the periphery of the lens, the introverted comatic aberration caused in the lower pencil of rays in the intermediate field angle can be excellently corrected.

When the aspherical surface deformation amount exceeds the upper limit of the expression (5), the image surface of the pencil of rays of large field angle becomes "over", so that it is not preferable. When it exceeds the lower limit, the comatic aberration of the lower pencil of rays can not be sufficiently corrected.

As shown in FIGS. 3 and 4, in order to balance the distortion and comatic aberration, the lens thickness on the optical axis is reduced, and the distance between the lens and the diaphragm is increased so as to correct the comatic aberration that has been deteriorated when the lens thickness was reduced. At this time, the distortion is a little increased, however, the influence can be neglected. Therefore, even if an aspherical surface is not used as shown in FIG. 1B, the distortion and the comatic aberration can be excellently balanced when the lens and the diaphragm are appropriately separated.

In the case where a value t/L exceeds the upper limit of the expression (6), the distortion is increased too much, and when the value exceeds the lower limit, the comatic aberration is increased too much. As a result, it is necessary to extend the distance between the lens and the diaphragm, so that the edge thickness of the lens can not be sufficiently provided, which is not desirable.

The lower limit is basically permissible if it satisfies the relation:

$$0 < t/L$$

It is preferable if it satisfies the relation:

$$0.04 < t/L$$

When a value of x/f exceeds the upper limit of the expression (7), a sufficient edge thickness of the lens can not be provided, and the distortion is increased a little, which is not desirable. When the value exceeds the lower limit, the introverted comatic aberration is increased too much.

In the aforementioned constitution, when both surfaces of the meniscus lens or at least one surface on the object side is formed in such a manner that the aspherical surface deformation amount is monotonously increased as the height from the optical axis is increased, the refracting power on the object side is reduced with respect to the pencil of rays outside the axis, the field angle of which is large. Therefore, the distortion can be further reduced.

There is a tendency that the image surface becomes "over" at this time. However, when the lens surface on the image formation surface side is also formed to be aspherical, this tendency can be corrected since the refracting power on the image formation surface side is reduced as it is separated from the optical axis.

In the present invention, when the image formation surface is curved onto the lens side, the image forming performance can be improved. It is preferable that the radius of curvature is 80 mm to 300 mm, and more preferably the surface is formed cylindrical, the radius of curvature of which is 100 mm to 200 mm.

$$n_d < 1.75 \tag{8}$$

$$\nu_d > 45 \tag{9}$$

When a value of $n_d$ exceeds the upper limit of the expression (8), the distortion is increased, and when a value of $\nu_d$ exceeds the lower limit of the expression (9), the chromatic aberration on the axis and chromatic aberration of magnification are undesirably increased.

DETAILED DESCRIPTION OF THE PREFERRED EMBODIMENTS

Examples of the present invention will be shown as follows. In the tables, the following reference characters are used.

r: radius of curvature of the refracting surface
d: interval of refracting surfaces
$n_d$: refractive index of lens material
$v_d$: Abbe number of lens material
F: F number
$\omega$: half field angle When an optical axis direction is represented by X-axis, and a direction perpendicular to the optical axis is represented by Y-axis, the aspherical surface of the present invention can be expressed by expression 1.

$$X = \frac{Y^2/r}{1 + \sqrt{1 - (1+K)Y^2/r^2}} + \sum_{i=2}^{\infty} A_{2i}Y^{2i}$$

In this case, r is a paraxial radius of curvature, and K and $A_{2i}$ is an aspherical coefficient.

When the aspherical deformation amount is represented by A(Y), it can be expressed by Expression 2.

$$A(Y) = \frac{Y^2/r}{1 + \sqrt{1 - (1+K)Y^2/r^2}} + \sum_{i=2}^{\infty} A_{2i}Y^{2i} - \frac{Y^2/r}{1 + \sqrt{1 - Y^2/r^2}}$$

In the tables of the examples, the aspherical deformation amount of the first surface is represented by $A_F(Y)$, and the aspherical deformation amount of the second surface is represented by $A_R(Y)$.

In this case, $h_{max}$ is an effective radius of a lens, and the total lens length is defined as a length from the first lens surface to the image formation surface.

EXAMPLE 1

| Surface No. | f = 30.5 r | $F_{No}$ = 9.7 d | $n_d$ | $\omega$ = 35° $v_d$ |
|---|---|---|---|---|
| 1 | 3.297 | 1.000 | 1.492 | 57.0 |
| 2 | 3.803 | 1.200 | | |
| 3 | (Diaphragm) $\infty$ | | | |

Aspherical coefficient of the first surface
K = 0.30612
$A_4 = -0.30438 \times 10^{-3}$    $A_6 = 0.12905 \times 10^{-2}$
$A_8 = -0.48454 \times 10^{-3}$    $A_{10} = 0.98378 \times 10^{-4}$
$A_{12} = -0.46842 \times 10^{-5}$ Aspherical coefficient of the second surface
K = 2.43221
$A_4 = -0.24609 \times 10^{-2}$    $A_6 = 0.17419 \times 10^{-2}$
$A_8 = -0.13013 \times 10^{-2}$    $A_{10} = 0.42301 \times 10^{-3}$
$A_{12} = -0.57290 \times 10^{-4}$
t/L = 0.046                         Total lens length = 28.5
$2\omega = 70°$                     x/L = 0.055
$A_F(hmax)/A_F(\frac{1}{2}hmax) = 38$
$A_R(hmax)/A_R(\frac{1}{2}hmax) = 32$

| h | $A_F(h)$ |
|---|---|
| 0.3 | $0.717 \times 10^{-5}$ |
| 0.6 | $0.157 \times 10^{-3}$ |
| 0.9 | $0.108 \times 10^{-2}$ |
| 1.2 | $0.431 \times 10^{-2}$ |
| 1.5 | $0.129 \times 10^{-1}$ |
| 1.8 | $0.339 \times 10^{-1}$ |
| 2.1 | $0.893 \times 10^{-1}$ |

| h | $A_R(h)$ |
|---|---|
| 0.3 | $0.266 \times 10^{-4}$ |
| 0.6 | $0.501 \times 10^{-3}$ |
| 0.9 | $0.302 \times 10^{-2}$ |
| 1.2 | $0.114 \times 10^{-1}$ |
| 1.5 | $0.343 \times 10^{-1}$ |
| 1.8 | $0.971 \times 10^{-1}$ |

EXAMPLE 2

| Surface No. | f = 32.0 r | $F_{No}$ = 9.7 d | $n_d$ | $\omega$ = 34° $v_d$ |
|---|---|---|---|---|
| 1 | 3.680 | 1.200 | 1.492 | 57.0 |
| 2 | 4.286 | 1.200 | | |
| 3 | (Diaphragm) $\infty$ | | | |

Aspherical coefficient of the first surface
K = 0.42707
$A_4 = -0.69537 \times 10^{-3}$    $A_6 = 0.10980 \times 10^{-2}$
$A_8 = -0.45451 \times 10^{-3}$    $A_{10} = 0.86531 \times 10^{-4}$
$A_{12} = -0.53103 \times 10^{-5}$ Aspherical coefficient of the second surface
K = 1.37072
$A_4 = 0.13367 \times 10^{-3}$     $A_6 = 0.17598 \times 10^{-2}$
$A_8 = -0.10083 \times 10^{-2}$    $A_{10} = 0.31409 \times 10^{-3}$
$A_{12} = -0.30646 \times 10^{-4}$
t/L = 0.055                         Total lens length = 29.7
$2\omega = 68°$                     x/L = 0.055
$A_F(hmax)/A_F(\frac{1}{2}hmax) = 31$
$A_R(hmax)/A_R(\frac{1}{2}hmax) = 27$

| h | $A_F(h)$ |
|---|---|
| 0.3 | $0.389 \times 10^{-5}$ |
| 0.6 | $0.975 \times 10^{-4}$ |
| 0.9 | $0.718 \times 10^{-3}$ |
| 1.2 | $0.292 \times 10^{-2}$ |
| 1.5 | $0.842 \times 10^{-2}$ |
| 1.8 | $0.205 \times 10^{-1}$ |
| 2.1 | $0.481 \times 10^{-1}$ |

| h | $A_R(h)$ |
|---|---|
| 0.3 | $0.201 \times 10^{-4}$ |
| 0.6 | $0.376 \times 10^{-3}$ |
| 0.9 | $0.223 \times 10^{-2}$ |
| 1.2 | $0.807 \times 10^{-2}$ |
| 1.5 | $0.229 \times 10^{-1}$ |
| 1.8 | $0.594 \times 10^{-1}$ |

EXAMPLE 3

| Surface No. | f = 32.0 r | $F_{No}$ = 9.7 d | $n_d$ | $\omega$ = 34° $v_d$ |
|---|---|---|---|---|
| 1 | 3.092 | 0.800 | 1.492 | 57.0 |
| 2 | 3.520 | 1.200 | | |
| 3 | (Diaphragm) $\infty$ | | | |

Aspherical coefficient of the first surface
K = 0.60476
$A_4 = -0.10599 \times 10^{-3}$    $A_6 = 0.83996 \times 10^{-3}$
$A_8 = -0.35885 \times 10^{-3}$    $A_{10} = 0.61458 \times 10^{-4}$
$A_{12} = 0.13078 \times 10^{-5}$ Aspherical coefficient of the second surface
K = 1.96923
$A_4 = -0.14855 \times 10^{-2}$    $A_6 = 0.26017 \times 10^{-2}$
$A_8 = -0.16819 \times 10^{-2}$    $A_{10} = 0.47298 \times 10^{-3}$
$A_{12} = -0.40585 \times 10^{-4}$
t/L = 0.037                         Total lens length = 30.0
$2\omega = 68°$                     x/L = 0.055
$A_F(hmax)/A_F(\frac{1}{2}hmax) = 39$
$A_R(hmax)/A_R(\frac{1}{2}hmax) = 34$

| h | $A_F(h)$ |
|---|---|
| 0.3 | $0.207 \times 10^{-4}$ |
| 0.6 | $0.368 \times 10^{-3}$ |

-continued

| h | $A_F(h)$ |
|---|---|
| 0.9 | $0.213 \times 10^{-2}$ |
| 1.2 | $0.772 \times 10^{-2}$ |
| 1.5 | $0.221 \times 10^{-1}$ |
| 1.8 | $0.589 \times 10^{-1}$ |
| 2.1 | 0.169 |

| h | $A_R(h)$ |
|---|---|
| 0.3 | $0.361 \times 10^{-4}$ |
| 0.6 | $0.679 \times 10^{-3}$ |
| 0.9 | $0.409 \times 10^{-2}$ |
| 1.2 | $0.153 \times 10^{-1}$ |
| 1.5 | $0.462 \times 10^{-1}$ |
| 1.8 | 0.139 |

EXAMPLE 4

$f = 32.0 \quad F_{No} = 9.7 \quad \omega = 34°$

| Surface No. | r | d | $n_d$ | $\nu_d$ |
|---|---|---|---|---|
| 1 | 3.092 | 0.800 | 1.492 | 57.0 |
| 2 | 3.520 | 1.600 | | |
| 3 | (Diaphragm) ∞ | | | |

Aspherical coefficient of the first surface
K = 0.60476
$A_4 = -0.10599 \times 10^{-3}$    $A_6 = 0.84000 \times 10^{-3}$
$A_8 = -0.35885 \times 10^{-3}$    $A_{10} = 0.61458 \times 10^{-4}$
$A_{12} = 0.13078 \times 10^{-5}$ Aspherical coefficient of the second surface
K = 1.96923
$A_4 = -0.14855 \times 10^{-2}$    $A_6 = 0.26017 \times 10^{-2}$
$A_8 = -0.16819 \times 10^{-2}$    $A_{10} = 0.47298 \times 10^{-3}$
$A_{12} = -0.40585 \times 10^{-4}$
t/L = 0.037          Total lens length = 30.0
$2\omega = 68°$       x/L = 0.074
$A_F(hmax)/A_F(\frac{1}{2}hmax) = 39$
$A_R(hmax)/A_R(\frac{1}{2}hmax) = 34$

| h | $A_F(h)$ |
|---|---|
| 0.3 | $0.207 \times 10^{-4}$ |
| 0.6 | $0.368 \times 10^{-3}$ |
| 0.9 | $0.213 \times 10^{-2}$ |
| 1.2 | $0.772 \times 10^{-2}$ |
| 1.5 | $0.221 \times 10^{-1}$ |
| 1.8 | $0.589 \times 10^{-1}$ |
| 2.1 | 0.169 |

| h | $A_R(h)$ |
|---|---|
| 0.3 | $0.361 \times 10^{-4}$ |
| 0.6 | $0.679 \times 10^{-3}$ |
| 0.9 | $0.409 \times 10^{-2}$ |
| 1.2 | $0.153 \times 10^{-1}$ |
| 1.5 | $0.462 \times 10^{-1}$ |
| 1.8 | 0.139 |

EXAMPLE 5

$f = 30.0 \quad F_{No} = 9.7 \quad \omega = 36°$

| Surface No. | r | d | $n_d$ | $\nu_d$ |
|---|---|---|---|---|
| 1 | 6.228 | 1.05 | 1.713 | 53.9 |
| 2 | 8.170 | 3.55 | | |
| 3 | (Diaphragm) ∞ | | | | t/L = 0.048
x/f = 0.118
Total lens length = 28.9

EXAMPLE 6

$f = 30.0 \quad F_{No} = 9.7 \quad \omega = 36°$

| Surface No. | r | d | $n_d$ | $\nu_d$ |
|---|---|---|---|---|
| 1 | 5.949 | 1.25 | 1.492 | 57.0 |
| 2 | 9.254 | 3.71 | | |
| 3 | (Diaphragm) ∞ | | | | t/L = 0.058
x/f = 0.124
Total lens length = 29.3

EXAMPLE 7

$f = 30.0 \quad F_{No} = 9.7 \quad \omega = 36°$

| Surface No. | r | d | $n_d$ | $\nu_d$ |
|---|---|---|---|---|
| 1 | 5.839 | 1.45 | 1.492 | 57.0 |
| 2 | 8.874 | 3.34 | | |
| 3 | (Diaphragm) ∞ | | | | t/L = 0.067
x/f = 0.111
Total lens length = 29.0

EXAMPLE 8

$f = 30.0 \quad F_{No} = 9.7 \quad \omega = 36°$

| Surface No. | r | d | $n_d$ | $\nu_d$ |
|---|---|---|---|---|
| 1 | 6.103 | 1.450 | 1.492 | 57.0 |
| 2 | 9.583 | 3.540 | | |
| 3 | (Diaphragm) ∞ | | | |

Aspherical coefficient of the first surface
$K = -0.10519 \times 10^{-2}$
$A_4 = -0.21384 \times 10^{-3}$    $A_6 = -0.35992 \times 10^{-5}$
$A_8 = -0.24606 \times 10^{-5}$    $A_{10} = -0.69894 \times 10^{-7}$
$A_{12} = -0.22113 \times 10^{-8}$ Aspherical coefficient of the second surface
$K = -0.62895 \times 10^{-5}$
$A_4 = -0.30058 \times 10^{-3}$    $A_6 = -0.30842 \times 10^{-4}$
$A_8 = -0.46406 \times 10^{-6}$    $A_{10} = -0.30668 \times 10^{-7}$
$A_{12} = -0.10879 \times 10^{-8}$
t/L = 0.067
x/f = 0.118
Total lens length = 29.1

| h | $A_F(h)$ |
|---|---|
| 0.5 | $-0.133 \times 10^{-4}$ |
| 1.0 | $-0.213 \times 10^{-3}$ |
| 1.5 | $-0.110 \times 10^{-2}$ |
| 2.0 | $-0.377 \times 10^{-2}$ |
| 2.5 | $-0.107 \times 10^{-1}$ |
| 3.0 | $-0.280 \times 10^{-1}$ |
| 3.5 | $-0.692 \times 10^{-1}$ |
| 4.0 | $-0.165$ |

| h | $A_R(h)$ |
|---|---|
| 0.5 | $-0.193 \times 10^{-4}$ |
| 1.0 | $-0.332 \times 10^{-3}$ |
| 1.5 | $-0.118 \times 10^{-2}$ |
| 2.0 | $-0.688 \times 10^{-2}$ |
| 2.5 | $-0.198 \times 10^{-1}$ |
| 3.0 | $-0.486 \times 10^{-1}$ |
| 3.5 | $-0.107$ |

EXAMPLE 9

$f = 30.0 \quad F_{No} = 9.7 \quad \omega = 36°$

| Surface No. | r | d | $n_d$ | $\nu_d$ |
|---|---|---|---|---|
| 1 | 6.479 | 1.620 | 1.492 | 57.0 |
| 2 | 10.581 | 3.390 | | |
| 3 | (Diaphragm) ∞ | | | |

Aspherical coefficient of the first surface
$K = -0.43182 \times 10^{-3}$
$A_4 = -0.35108 \times 10^{-3}$    $A_6 = -0.10522 \times 10^{-4}$
$A_8 = -0.64139 \times 10^{-6}$    $A_{10} = -0.24583 \times 10^{-7}$ -continued Aspherical coefficient of the second surface $K = -0.35709 \times 10^{-4}$
$A_4 = -0.56864 \times 10^{-3}$    $A_6 = -0.28391 \times 10^{-4}$
$A_8 = -0.11774 \times 10^{-6}$    $A_{10} = -0.28417 \times 10^{-8}$
$t/L = 0.075$
$x/f = 0.113$
Total lens length = 29.2

| h | $A_F(h)$ |
|---|---|
| 0.5 | $-0.221 \times 10^{-4}$ |
| 1.0 | $-0.362 \times 10^{-3}$ |
| 1.5 | $-0.192 \times 10^{-2}$ |
| 2.0 | $-0.648 \times 10^{-2}$ |
| 2.5 | $-0.175 \times 10^{-1}$ |
| 3.0 | $-0.418 \times 10^{-1}$ |
| 3.5 | $-0.933 \times 10^{-1}$ |
| 4.0 | $-0.201$ |

| h | $A_R(h)$ |
|---|---|
| 0.5 | $-0.360 \times 10^{-4}$ |
| 1.0 | $-0.597 \times 10^{-3}$ |
| 1.5 | $-0.321 \times 10^{-2}$ |
| 2.0 | $-0.109 \times 10^{-1}$ |
| 2.5 | $-0.294 \times 10^{-1}$ |
| 3.0 | $-0.677 \times 10^{-1}$ |
| 3.5 | $-0.141$ |

EXAMPLE 10

In this example, a camera is constituted in the following manner: a positive meniscus lens is used, the convex surface of which is opposed to the object side; the image formation surface is formed into a cylindrical surface that is curved on the lens side and the radius of curvature of the cylindrical surface is 110 mm; a diaphragm is disposed between the positive meniscus lens and the image formation surface; a value of t/L is 0.046 and a value of x/L is 0.055 where the length of a diagonal line of the image plane on the image formation surface is 2L, the thickness of the meniscus lens on the optical axis is t, and the distance between the second surface of the meniscus lens and the diaphragm is x, so that the projection filed angle can be 70°; both sides of the meniscus lens is formed aspherical; when the aspherical deformation amount of the first surface is expressed by function $A_F(h)$ and that of the second surface is expressed by function $A_R(h)$, the inequalities of $A_F(h) > 0$ and $A_R(h) > 0$ are satisfied so that the function can be a monotonously increasing function; and when the effective radius of the lens is $h_{max}$, the equations of $AF(h_{max})/AF(\tfrac{1}{2}h_{max}) = 38$ and $AR(h_{max})/AR(\tfrac{1}{2}h_{max}) = 32$ are satisfied so as to provide an aspherical lens.

EXAMPLE 11

In this example, a camera is constituted in the following manner: a positive meniscus lens is used, the convex surface of which is opposed to the object side; the image formation surface is formed into a cylindrical surface that is curved on the lens side and the radius of curvature of the cylindrical surface is 110 mm; a diaphragm is disposed between the positive meniscus lens and the image formation surface; a value of t/L is 0.058 and a value of x/f is 0118 where the length of a diagonal line of the image plane on the image formation surface is 2L, the thickness of the meniscus lens on the optical axis is t, the focal distance is f, and the distance between the second surface of the meniscus lens and the diaphragm is x, so as to provide a lens, both sides of which are formed spherical.

According to the present invention, as shown in the examples, the total lens length is approximately 30 mm, which is short, with respect to the image plane of Licasize, however, the distortion is corrected to a value of not more than 10%, and as can be seen in the lateral aberration diagram, the amount of comatic aberration and that of chromatic aberration of magnification are small, so that a lens having excellent image formation performance can be provided. Therefore, the lens of the present invention is suitable for a compact fixed-focus camera and a disposable photographic camera.

Especially, in the first invention the outer diameter of a lens can be reduced and a sufficient edge thickness can be provided to the lens. Compared with the second invention, the first invention can provide an excellent performance with respect to chromatic aberration of magnification.

In the second invention, even in the case of a spherical lens that can be easily manufactured, distortion can be reduced.

What is claimed is:

1. A photographic lens for an image forming apparatus having an image forming surface and a diaphragm disposed between the lens and the image forming surface, the lens comprising:

a positive meniscus lens to form an image of an object on the image forming surface, the lens having a convex surface at its object side and a second surface facing the diaphragm, wherein the lens satisfies the following inequalities:

$0.04 < t/L < 0.08$ and $0.1 < x/f < 0.15$ wherein the length of a diagonal line of an image forming plane on the image forming surface is 2L, the lens thickness on the optical axis is t, the distance between the second surface of the lens and the diaphragm is x and the focal distance of the lens is f.

2. The photographic lens of claim 1, wherein at least the lens surface at the object side of the lens is an aspherical surface and an amount of the deformation at a position in the profile of the aspherical surface is monotonously increased as the height of the position from the optical axis is increased.

3. The photographic lens of claim 1, wherein the image forming surface is a cylindrical surface.

4. A photographing camera, comprising:

an image forming surface on which a photographic film is exposed with a formed image through a lens, the image forming surface being a curved cylindrical surface;

the lens being a positive meniscus lens which has a convex surface at its object side and a second surface facing the image forming surface, and a diaphragm disposed between the lens and the image forming surface;

the lens arranged to satisfy the following inequalities:

$0.04 < t/L < 0.08$ and $0.1 < x/f < 0.15$ wherein the length of a diagonal line of an image forming plane on the image forming surface is 2L, the lens thickness on the optical axis is t, the distance between the second surface of the lens and the diaphragm is x and the focal distance of the lens is f.

* * * * *